United States Patent
Llewellyn et al.

(10) Patent No.: US 6,909,951 B2
(45) Date of Patent: Jun. 21, 2005

(54) FAIL-SAFE TORQUE TRANSDUCER SYSTEM

(75) Inventors: David R. Llewellyn, West Bloomfield, MI (US); William G. Spadafora, Clarkston, MI (US); Jason G. Kramer, Sterling Heights, MI (US)

(73) Assignee: Dana Corporation, Ottawa Lake, MI (US)

(*) Notice: Subject to any disclaimer, the term of this patent is extended or adjusted under 35 U.S.C. 154(b) by 0 days.

(21) Appl. No.: 10/661,996

(22) Filed: Sep. 12, 2003

(65) Prior Publication Data

US 2005/0060075 A1 Mar. 17, 2005

(51) Int. Cl.[7] .................................... B62D 6/00
(52) U.S. Cl. ................................ 701/43; 180/78
(58) Field of Search ................ 701/36, 41, 43; 180/6.2, 6.24, 6.44, 78, 6.6, 315, 426–428, 431–432, 435–438, 447; 74/492; 33/612

(56) References Cited

U.S. PATENT DOCUMENTS

| | | |
|---|---|---|
| 4,724,710 A | 2/1988 | Murty |
| 5,267,627 A | 12/1993 | Frank et al. |
| 5,307,892 A * | 5/1994 | Phillips ............... 180/422 |
| 5,348,110 A | 9/1994 | Klein et al. |
| 5,969,919 A | 10/1999 | Kobayashi et al. |
| 5,975,136 A | 11/1999 | Heitzer |
| 6,148,949 A | 11/2000 | Kobayashi et al. |
| 6,152,254 A | 11/2000 | Phillips |
| 6,158,545 A | 12/2000 | Kaji et al. |
| 6,226,580 B1 | 5/2001 | Noro et al. |
| 6,240,349 B1 | 5/2001 | Nishimoto et al. |
| 6,285,936 B1 | 9/2001 | Bohner et al. |
| 6,298,941 B1 | 10/2001 | Spadafora |
| 6,338,016 B1 | 1/2002 | Miller et al. |
| 6,450,044 B1 | 9/2002 | Eisenhauer et al. |
| 6,459,972 B2 | 10/2002 | Kodaka et al. |
| 6,474,437 B1 | 11/2002 | Elser et al. |
| 6,497,303 B1 | 12/2002 | Nishimura et al. |
| 6,498,451 B1 | 12/2002 | Boules et al. |

* cited by examiner

*Primary Examiner*—Thu V. Nguyen
(74) *Attorney, Agent, or Firm*—Reising, Ethington, Barnes, Kisselle, P.C.

(57) ABSTRACT

A fail-safe torque transducer, and automotive power steering system, utilizing a two-stage series coupled torsion bar system. A first stage torsion bar provides tuning of the steering system, and by reducing its diameter relative to the second stage, provides a lower torsional spring rate and higher operational stress level than that of the second stage. The second stage torsion bar provides the stress/strain indicia referenced by a torque-measuring device, and is stressed at a lower level than the first stage and therefore has a higher cycle life than that of the first stage bar. Hence, if stress related failure ever occurs, it will only occur in the first stage torsion bar, thereby preventing any torque from reaching the second stage, thereby causing a zero strain signal and thus rendering the system fail-safe and not subject to instability of vehicle steering if the torsion bar breaks.

14 Claims, 1 Drawing Sheet

FAIL-SAFE TORQUE TRANSDUCER SYSTEM

FIELD OF THE INVENTION

This invention relates generally to systems for measuring the torque transmitted through a rotary shaft, and in particular, rotating shafts such as found in hydraulic and electric power steering systems in vehicle applications.

BACKGROUND AND SUMMARY OF THE INVENTION

It is well known in the torque-sensing art that the deformation, or twist, of a rotary shaft under load can be sensed as a measure of the torque being transmitted through the shaft. In relatively low torque applications where the amount of twist may be too small for accurate measurement, such as in automotive power steering systems, the twist is typically augmented by inserting a torsion bar between two relatively rigid sections of the steering column shaft. The relative rotation of the more rigid sections of the shaft may be mechanically or electrically detected using a variety of techniques.

In a safety-critical system such as vehicle steering, any single-point failure must be safe. Torque transducers used in existing vehicle steering-assist systems include a torsion bar that can fracture. If fracture occurs, this can result in an unsafe vehicle control mode. It is an object of the present invention to eliminate this undesirable failure mode by providing a new and improved fail-safe power-assist vehicle steering system.

In the case of the conventional hydraulic power-assist power steering system in common use today, the torsion bar may be in the form of a separate element, as in the case of a conventional rotary hydraulic power steering valve. This hydraulic control valve is actuated by the twisting of the torsion bar. That twisting in turn causes the sleeve valve to open, resulting in power-assist to the steering linkage that is proportional to the torque input exerted on the steering wheel by the vehicle operator. The torsion bar has two functions in this typical hydraulic system: (1) to tune the system dynamics (feel) and (2) to provide the proportional strain that opens the hydraulic control valve for the power-assist system.

However, if the torsion bar breaks, the resulting power-assist applied to the steering linkage is no longer proportional to driver input torque, but can range from full left power-assist to full right power-assist with virtually no change in driver input torque, thus causing vehicle instability even though the shunt is operational to provide a direct mechanical link between the steering wheel and steering gear in parallel with the broken torsion bar in the steering column. There is therefore a need for a fail-safe system for protecting a torque-sensing device from such unstable operation in the event the torsion bar breaks, and which also provides the aforementioned two torsion bar functions.

Generally the use of a torsion bar requires the use of a conventional mechanical shunt fail-safe mechanism, i.e., a torque-limiting device to prevent failure of the torsion bar when unavoidable torque overload conditions occur. Such torque-limiting devices are well known in the art of vehicle steering, and will therefore not be described in this specification. Instead, such devices will be merely referred to as "shunts".

In general, and by way of summary description and not by way of limitation, the present invention overcomes the aforementioned torsion bar failure problem by providing a torque transducer that includes first and second torsion bar stages connected in series. The first stage is constructed to have a lower torsion spring rate (i.e., force-constant or stiffness coefficient) than the second stage. A conventional torque sensor is operatively coupled only to the second stage for measuring applied steering torque as a function of torsional strain produced by the torsional stress transmitted therealong. Only this second stage and associated torque sensor are used to provide the torque-measuring signal in the system.

The first torsion bar stage is constructed to have a failure mode at a lower stress level than the second stage torsion bar stage, and thus is provided as a sacrificial "weak link" in the torque transducer. Therefore, if a stress related failure ever occurs, it will occur only in the first stage. Such failure in the first stage in turn will prevent any torque from reaching the second stage torsion bar. With zero input torque to the second stage upon first stage failure, the torque sensor will see only zero strain, thereby providing a system that is fail-safe because only a "zero" torque signal can be generated in the event of torsion bar failure, thereby avoiding the aforementioned vehicle instability problem. Moreover, in normal operation, the first stage torsion bar may be used to provide the low torsion rate for tuning of the steering system, i.e., to tune by initial design the system dynamics or "feel" and response for the steering system.

BRIEF DESCRIPTION OF THE DRAWING

The invention, together with additional objects, features and advantages thereof, will be best understood from the following detailed description, the appended claims and the accompanying drawing in which:

DETAILED DESCRIPTION OF THE PREFERRED EMBODIMENTS

Figure 1:
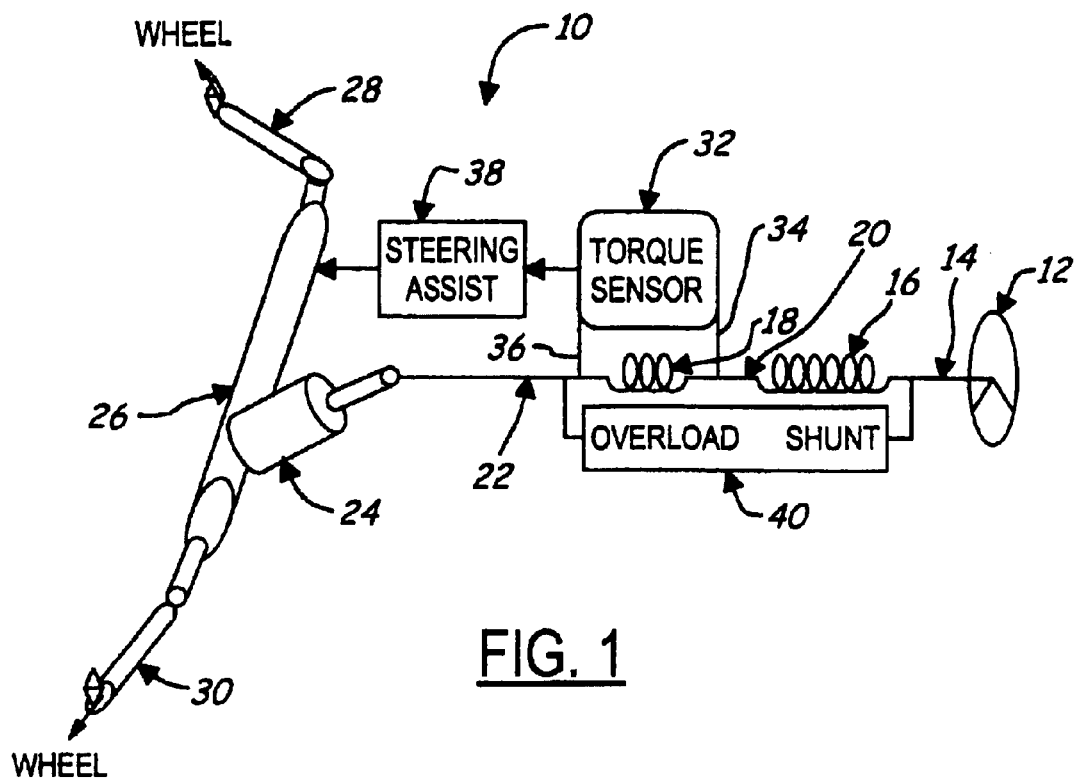
FIG. 1 is a partially schematic and partially semi-diagrammatic perspective composite view of a presently preferred but exemplary embodiment of a fail-safe vehicle power steering system constructed in accordance with the invention.

Referring now more particularly to the drawing, FIG. 1 shows, in an exemplary first embodiment of a two-stage torque transducer system 10 of the invention, a hand-operated steering wheel 12 directly coupled to a vehicle steering column 14 for rotating the same for applying steering control torque and rotation by the vehicle operator. Steering column 14 includes a first stage torsion bar 16 mechanically connected in series with a second stage torsion bar 18 by an intermediate steering column portion 20. The output end of torsion bar 18 is connected by steering column section 22 via the steering gear module 24 to the steering rack (not shown) disposed in the power-assist housing 26, the rack in turn being operatively coupled to the steering linkages 28 and 30 and thence to the right and left vehicle steering road wheels respectively.

The first stage torsion bar stage 16 is provided as a low spring rate, smaller diameter, higher stressed torsion bar element in the steering column, and is designed to provide the proper feel and response for the steering system. The second stage torsion bar 18 is characterized by a higher spring rate, due to its larger diameter, and therefore is a lower stressed element in the steering column. It is this second stage torsion bar 18 that is utilized to provide the proportional strain to be sensed by a conventional torque sensor 32 of system 10.

The power-assist system torque sensor 32 is thus shown diagrammatically operably coupled with axially spaced column motion detectors 34 and 36 of conventional construction. Motion detectors 34 and 36 sense the differential rotation of steering column sections 20 and 22 that are respectively mechanically coupled to the input and output of the second stage torsion bar 18. The torque signal thus developed by torque sensor 32 is electrically and operationally coupled to a steering-assist sub-system module 38 that controls the power-assist applied to the power-assist components in housing 26 to thereby augment torque input applied by the vehicle operator to steering wheel 12.

Both the first and second stage torsion bars 16 and 18 are protected from torsional overload by a conventional overload shunt 40. This shunt grounds out above a pre-set deformation or twist of the steering column between column section 14 and column section 22, i.e., a pre-determined angular amount, such as plus or minus 3.5 mechanical degrees. Within the plus or minus 3.5 degrees of twist, the first and second torsion bar stages normally function to transmit all of the applied steering control torque between steering column section 14 and 22. However, torque in excess of that required to produce plus or minus 3.5 degrees of twist is transmitted via the overload shunt 40. Thus, in a failure mode of operation wherein one or both of the first and second stage torsion bars 16 and 18 is fractured, shunt 40 will directly couple the steering wheel 12 to the steering mechanism 22–30 for unassisted manual steering. The invention assures that this manual steering override can be accomplished without providing extraneous signals to the steering power-assist means.

Figure 2:
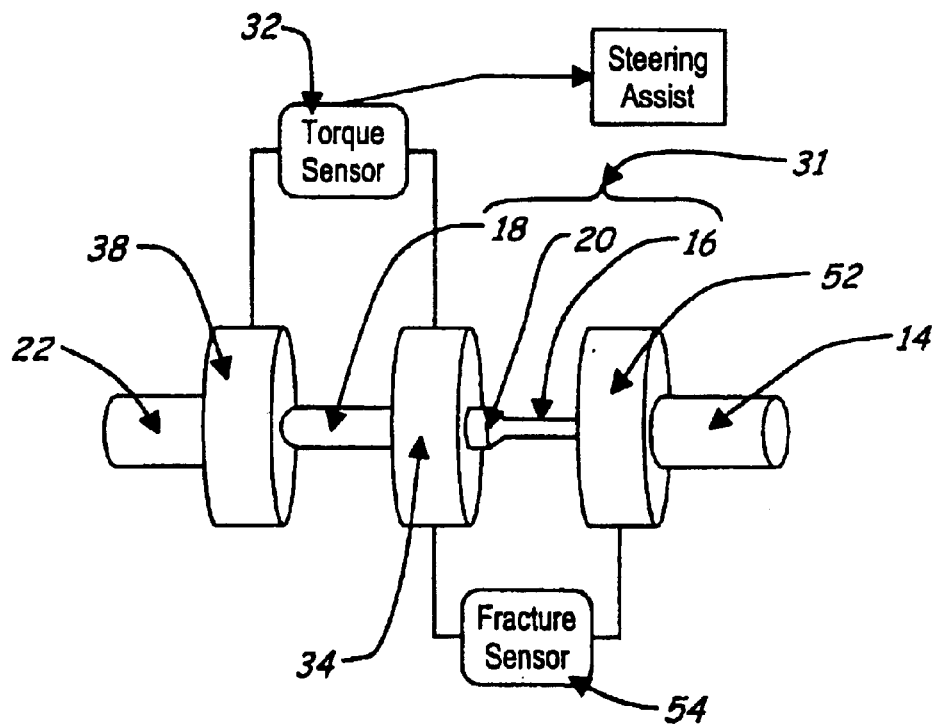
FIG. 2 is a partially schematic and partially simplified mechanical diagrammatic illustration of one embodiment of first and second torsion bar stages connected in series and employed in the system of FIG. 1, and illustrating schematically the associated torque sensor coupling thereto, as well as the addition of a fracture sensing system for the two-stage torsion bar system.

In accordance with the present invention, second stage torsion bar 18 cannot fracture because it is lower or less stressed than the first stage torsion bar 16 since, as shown in FIG. 2, bar 18 consists of a larger diameter bar. Therefore, for any given value of torque being transmitted from the steering wheel 12 to steering gear 24, the stresses in bar 18 are lower than those in bar 16. As a result, the second stage torsion bar 18 will have a higher cycle life than that of the first stage, and hence if stress-related failure ever occurs, it will occur only in the first stage torsion bar 16.

Any failure of the first stage torsion bar 16 will prevent, of course, any torque from reaching the second stage torsion bar 18. In other words, failure of the first stage torsion bar 16 will result in separation (mechanical decoupling) of the second stage torsion bar 18 from any input torque applied to steering wheel 12. This in turn will protect the second stage torsion bar 18 from ever failing due to torsional cyclic loading. Additionally, this "weak link" relationship of the first and second stages will prevent an erroneous (high) torque signal from being produced by the torque sensor 32, since sensor 32 will see only zero strain if and when the first stage torsion bar 16 is fractured. Accordingly, the invention thus provides a very simple, reliable and novel system that is fail-safe insofar as only a "zero" torque signal can be generated upon torsion bar failure, thereby avoiding vehicle instability problems resulting from such failure in prior systems.

FIG. 2 illustrates diagrammatically one mechanical embodiment of the first and second torsion bars 16 and 18.

As illustrated in FIG. 2, the first and second torsion bars may together comprise an integral (i.e., made in one piece as initially formed) two section torsion bar in which the first section torsion bar 16 has a reduced diameter as compared with the second section torsion bar 18. Since the second section torsion bar 18 is considerably larger in diameter than the first section torsion bar 16, the second section torsion bar 18 has a higher torsion spring rate (stiffness coefficient) and is less stressed when functioning as a torsion spring than the first section bar 16, and it is only this larger diameter second section torsion bar 18 that provides the proportional strain for the torque sensor 32 which inputs to the electronically controlled steering-assist system 38. As can be seen in the illustration of FIG. 2, fracture failure of the first stage torsion bar 16 will prevent any torque from reaching the second section torsion bar 18. Hence, this fail-safe feature prevents any torque signal from being generated (other than zero) due to the absence of torsional strain in the second section torsion bar 18 if the first section torsion bar 16 is fractured. Torsion bar 31 may be of any suitable elastic material, such as steel.

In a further add-on embodiment of the foregoing torque transducer system, and as shown in FIG. 2 it will be understood that the invention also contemplates the provision of a fracture sensor processing system 54 having sensing devices 34 and 52 operably coupled to fracture sensor system 54 and located for respectively sensing the angular positions of the input ends of the second section torsion bar 18 and first section torsion bar 16. This can be in the form of the angular position sensor 34 operatively coupled to the input end of second section torsion bar 18, and an additional such sensor 52 operatively coupled to the input end of first section torsion bar 16. These sensors 34, 52 are also operatively coupled to fracture-sensor signal processing system 54 that is suitably designed to signal when the first section torsion bar 16 is fractured, and thus has been sensed to have rotated through an angle displaced a given amount from its unfractured relationship to the second section torsion bar 18. Fracture-sensor 54 thus could be set to respond to relative twist between the first and second sections torsion bars 16 and 18 of the plus or minus 3.5 degree shunt limit indicated previously in relation to the operation of the overload shunt 40.

Output from fracture-sensor 54 can also be coupled into a control input for any system in which the torque signal is relevant in order to permit that system to switch to a fail-safe mode when the torque transducer can no longer provide control direction. The vehicle ECU can also be provided with suitable computer network circuitry and a sub-routine operationally related to the torque signal of the steering system and designed to prevent the inhibition of steering wheel movement in the event that the steering wheel is rotated by the driver in the absence of a torque signal from torque sensor 32 due to a broken torsion bar 16.

From the foregoing description and accompanying drawing, it is believed that those of ordinary skill in the art will now fully appreciate that the invention as disclosed herein provides a significant improvement over the prior art, and provides many advantages for application to torque transducer systems, and in particular to automotive power steering systems that employ torque sensors. Provision of a sacrificial first stage torsion bar 16 in mechanically coupled series driving relationship with the second stage torsion bar 18 is a very inexpensive solution to the aforestated problems that otherwise can result in an unsafe vehicle control mode.

Although the illustrated embodiments have been discussed in conjunction with conventional hydraulic power-assist vehicle steering systems commonly employed in automotive vehicles of current manufacture, the invention is by no means limited to such applications. The invention can be employed in any application in which it is desired to render a torque-sensing system fail-safe despite torsion bar fracture in the system. Several modifications and variations have been disclosed. Other modifications and variations will readily suggest themselves to persons of ordinary skill in the art. The invention is therefore intended to embrace all such modifications and variations as fall within the spirit and broad scope of the appended claims.

What is claimed is:

1. A torque transducer that includes:

first and second stage torsion bars connected in series, said first stage torsion bar being characterized as having a higher torsional stress in torque transmitting operation than said second stage torsion bar, and a torque sensor operatively coupled to said second stage torsion bar for measuring torque as a function of stress in said second stage torsion bar independent of said first stage torsion bar.

2. The torque transducer of claim 1 further including a torsion overload shunt bridging said first and second stages for coupling the input of the first stage to the output of the second stage so that torque can be transmitted therebetween via said shunt in the event of a given differential torsional strain value being exceeded, such as occurs upon failure of either of said torsion bar stages.

3. The torque transducer of claim 1 further including a failure sensor operatively coupled across the input of said first torsion bar stage and the input of said second torsion bar stage and operable to provide a sensor signal indicative of failure of either of said torsion bars.

4. The torque transducer of claim 1 wherein said first and second stage torsion bars comprise a single integrally formed torsion bar, a first section of said torsion bar comprising said first stage having a lesser cross sectional dimension than a second section of said torsion bar forming said second stage.

5. An automotive steering two-stage torque sensor system that includes:

An integrally formed torsion bar having first and second torsion bar sections respectively providing torsion bar first and second stages in series, a first coupling for connection of the input of said first stage to a vehicle steering wheel, a second coupling for connecting the output of said second stage through a steering shaft to a vehicle steering mechanism, said first torsion bar section being constructed and arranged to have a higher torsional stress level in torque transmitting operation than that of said second torsion bar section and designed for providing a given steering feel at the steering wheel, and a torque sensor operatively coupled to said second section torsion bar for measuring torque as a function of the stress/strain relationship in said second section torsion bar independent of the stress/strain relationship in said first section torsion bar.

6. The torque sensor of claim 5 that further includes an overload shunt bridging said first and second stages for coupling the input of the first stage to the output of the second stage so that torque can be transmitted therebetween via said shunt in the event of failure of either of said torsion bar stages.

7. The torque sensor of claim 5 further including a second sensor operatively coupled across the input of said first stage and the input of said second stage and operable to provide a sensor signal indicative of failure of either of said torsion bars.

8. A method of rendering a torque transducer torque sensing system fail-safe comprising the steps of:

(a) providing first and second torsion bar stages connected in series, (b) providing said first stage as one having a higher torsional stress level in torque transmitting operation than that of said second stage, and (c) providing a torque sensor operatively coupled to said second stage for measuring torque as a function of stress in said second stage independent of said first stage.

9. The method of claim 8 further including the step of providing a torsion overload shunt bridging said first and second stages for coupling the input of the first stage to the output of the second stage so that torque can be transmitted therebetween via said shunt in the event of failure of either of said torsion bar stages.

10. The method of claim 8 further including the step of providing a second sensor operatively coupled across said first and second torsion bar stages such that said second sensor is operable to provide a sensor signal indicative of failure of either of said torsion bars.

11. The method of claim 8 wherein said first and second torsion bar stages comprise a single integrally formed torsion bar, a first portion of said torsion bar comprising said first stage having a lesser cross sectional dimension than a second portion of said torsion bar forming said second stage.

12. A method of rendering an automotive steering torque sensor system fail-safe comprising the steps of:

(a) providing an integrally formed torsion bar having first and second torsion bar stages connected in series, (b) providing a first coupling for connecting the first stage input to a vehicle steering wheel, (c) providing a second coupling for connecting the second stage output through a steering shaft to a vehicle steering mechanism, (d) providing said first torsion bar stage as one having a higher torsional stress level in torque transmitting operation than that of said second torsion bar stage and designed for providing a given steering feel at the steering wheel, (e) operatively coupling a torque sensor to said second torsion bar stage for measuring torque as a function of the stress/strain relationship in said second stage independent of such relationship in said first stage.

13. The method of claim 12 further including the step of providing an overload shunt bridging said first and second stages for coupling the input of the first stage to the output of the second stage so that torque can be transmitted therebetween via said shunt in the event of failure of either of said torsion bar stages.

14. The method of claim 12 further including the step of providing a second sensor operatively coupled across the input of said first stage and the input of said second stage and operable to provide a sensor signal indicative of failure of either of said torsion bars.

* * * * *